United States Patent
Belmonte et al.

(10) Patent No.: US 8,998,579 B2
(45) Date of Patent: Apr. 7, 2015

(54) BLADE RETENTION DISK

(75) Inventors: Olivier Belmonte, Perthes en Gâtinais (FR); Lionel René Henri Weller, Champcueil (FR); Yann Frédéric Vincent Harnay, Viry-Châtillon (FR)

(73) Assignee: SNECMA, Paris (FR)

( * ) Notice: Subject to any disclaimer, the term of this patent is extended or adjusted under 35 U.S.C. 154(b) by 631 days.

(21) Appl. No.: 13/297,649

(22) Filed: Nov. 16, 2011

(65) Prior Publication Data

US 2012/0121428 A1 May 17, 2012

(30) Foreign Application Priority Data

Nov. 17, 2010 (FR) ...................... 10 59457

(51) Int. Cl.
- *F01D 5/02* (2006.01)
- *F01D 25/12* (2006.01)
- *F01D 5/30* (2006.01)
- *F01D 5/08* (2006.01)

(52) U.S. Cl.
CPC ................. *F01D 5/303* (2013.01); *F01D 5/082* (2013.01); *F01D 5/3069* (2013.01); *F05B 2240/801* (2013.01); *Y02T 50/671* (2013.01); *Y02T 50/676* (2013.01)

(58) Field of Classification Search
CPC ......... F01D 5/025; F01D 5/082; F01D 5/303; F01D 5/3038; F01D 5/3069; F05B 2240/801; F05D 2240/81

USPC .......... 415/115, 116; 416/90 R, 91, 215, 216, 416/218, 220 R

See application file for complete search history.

(56) References Cited

U.S. PATENT DOCUMENTS

| | | | | |
|---|---|---|---|---|
| 2,948,505 | A * | 8/1960 | Sonder | 416/96 R |
| 4,280,795 | A * | 7/1981 | Trousdell | 416/218 |
| 5,030,063 | A * | 7/1991 | Berger | 416/220 R |
| 7,374,400 | B2 * | 5/2008 | Boswell | 416/97 R |
| 8,282,355 | B2 * | 10/2012 | Blanchard et al. | 416/214 A |
| 8,348,619 | B2 * | 1/2013 | Derclaye et al. | 416/215 |

FOREIGN PATENT DOCUMENTS

FR 2918104 1/2009

* cited by examiner

*Primary Examiner* — Edward Look
*Assistant Examiner* — Jason Davis
(74) *Attorney, Agent, or Firm* — Pillsbury Winthrop Shaw Pittman LLP

(57) ABSTRACT

A blade retention disk includes, on its external surface, a peripheral annular groove configured to receive a plurality of blade roots of the hammer attachment type, the peripheral annular groove including a loading orifice intended for the introduction of blade roots inside the peripheral annular groove. The retention disk also includes: a crown covering the peripheral annular groove; a crown centering device to center the crown, the crown centering device and the crown forming an air supply enclosure from the bottom of the peripheral annular groove; at least one orifice opening in the air supply enclosure, the orifice being configured to introduce cooling air into the air supply enclosure. The blade retention disk finds a direct application in the field of low pressure turbines for aircraft turbine engines.

12 Claims, 3 Drawing Sheets

BLADE RETENTION DISK

CROSS-REFERENCE TO RELATED APPLICATIONS

This application claims the benefit of priority from French Patent Application No. 1059457 filed on Nov. 17, 2010, the entire content of which is incorporated herein by reference.

FIELD

The invention relates to a blade retention disk. More particularly, the invention relates to a disk for retaining blades of the hammer attachment type equipping an aircraft turbine engine.

BACKGROUND

As described in patent application No. FR0756066, turbine engine retention disks, such as disks 1 (Cf. FIG. 1) of a first stage 2 and of a second stage 3 of a low pressure turbine, conventionally comprise at their periphery a plurality of substantially transversal slots 4 in which the roots 5 of the blades 6 are assembled by insertion.

In addition, a platform is arranged between two adjacent blades 6 (not represented). The platform assembly that the retention disk comprises enables the profile of a stream to be formed, above which, when the turbine engine is operated, the gas circulates, the temperature of which is about 700 degrees.

It follows that the roots 5 of the blade 6 and the slots 4 are directly exposed to these high temperatures. Therefore, it is important to cool them to prevent any damage to the retention disks 1.

For this purpose, tapping off part of the air that flows outside of the flow stream of the low pressure turbine (i.e., from the compression chamber) to transport it via a cooling circuit to the slots 4 of the retention disks 1 is known.

The retention disks 1 of the first stage 2 and of the second stage 3 are centered on a longitudinal axis X of the turbine engine and are fixed to each other by means of bolted connections 7 regularly distributed around this axis X.

Each retention disk 1 comprises an annular bridle 8 presenting an upstream face on which is assembled an annular flange 9 forming an annular cavity 10. The latter is open at its lower end at the level of the compression chamber where air circulates, the temperature of which is about 400 degrees. At its opposite end, this annular cavity 10 opens in the bottom of each of the slots 4 and thus enables the slots 4 and the blade 6 roots 5 to be cooled. Cooling of the bottom of the slots 4 protects the retention disk 1 from any damage due to a high temperature.

On the other hand, the manufacture of retention disks 1 in conformance with the aforementioned disks is costly. This cost is particularly due to the need to manufacture, one at a time, by means of a stapler type machine tool, the slots 4 of the retention disk 1, which retention disk 1 usually comprises 160 slots 4.

In addition, the annular bridles 8, annular flanges 9 and the bolting elements 7 of a low pressure turbine constitute a considerable part of the mass and manufacturing cost of the low pressure turbine.

SUMMARY

In this context, an aspect of the invention proposes resolving the aforementioned problems. More particularly, an embodiment of the invention proposes providing a blade retention disk adapted to be cooled at the level of its peripheral surface and whose manufacturing cost is relatively low.

For this purpose, an embodiment of the invention relates to a blade retention disk comprising, on its external surface, a peripheral annular groove able to receive a plurality of blade roots of the hammer attachment type, said peripheral annular groove comprising a loading orifice intended for the introduction of blade roots inside said peripheral annular groove, said disk comprising: a crown covering said peripheral annular groove; a crown centering device configured to center said crown, said crown centering device and said crown forming an air supply enclosure from the bottom of said peripheral annular groove; at least one orifice opening in said air supply enclosure, said orifice being intended for introducing cooling air into said air supply enclosure.

Compared to a blade retention disk of the pinned type, the production of a blade retention disk with a hammer attachment is less costly. This beneficial special feature is particularly due to the need to produce a single annular groove for assembling all the blades, this groove being produced with a turning operation.

In addition, thanks to an embodiment of the invention and more particularly to the cooling enclosure, when a turbine engine equipped with such a blade retention disk is in operation, air from the compression chamber is introduced into the air supply enclosure via said orifice. This air supply enclosure opens into the annular groove such that the air contained in the enclosure may be diffused into the annular groove and thus cool the latter. Cooling of the bottom and edges of the groove allows the lifetime of the blade retention disk to be lengthened.

The blade retention disk according to an embodiment of the invention may also present one or more of the characteristics below, considered individually or according to all technically feasible combinations.

In a non-limiting, beneficial embodiment, the crown centering device is formed by an annular spoiler axially extending the retention disk at the level of the upstream periphery of said retention disk.

Upstream and downstream are defined with relation to the direction of air flow in the turbine engine, the air circulating from upstream to downstream.

In a non-limiting beneficial embodiment, the crown comprises a hook that is able to cooperate with the crown centering device. This cooperation is intended to ensure the leakproofness of the cooling air supply enclosure. The leakproofness is ensured only at the upstream side of the retention disk. Thus, the air that is introduced in this enclosure is forced to escape from the downstream side of the retention disk, i.e., after having crossed and cooled the annular groove.

In a non-limiting beneficial embodiment, the crown is formed by a metal band wound on itself.

In a non-limiting, beneficial embodiment, the crown is equipped with a plurality of radial openings, each radial opening being positioned opposite from the peripheral annular groove. Thus, when the blade roots are positioned in the annular groove, each blade root traverses one of the crown openings.

In a non-limiting, beneficial embodiment, the crown comprises a plurality of reflectors intended to be arranged in the annular groove, each reflector being positioned between two radial openings and extending radially from the inner surface of said crown to its center. Each reflector beneficially enables the air contained in the cooling enclosure to be directed to the bottom of the annular groove.

In a non-limiting, beneficial embodiment, the orifice crosses the crown centering device. The location of this orifice prevents the retention disk from being weakened in areas subjected to high stresses, such as, for example, the area near the annular groove.

An aspect of the invention also relates to a blade retention drum. The retention drum comprises at least two blade retention disks in conformance with an embodiment of the invention. The two disks are coaxial and form an integral part with each other, for example by welding. The utilization of a drum enables the weight of the turbine engine equipped with two blade retention disks to be reduced. In fact, a drum presents a weight of less than the weight of the pinned disks that form an integral part with each other by means of bolted connections.

In other words, thanks to an embodiment of the invention, it is possible to use a drum and cool the blade roots of this drum.

An aspect of the invention also relates to a turbine engine comprising at least one blade retention disk according to an embodiment of the invention.

An aspect of the invention also relates to a method of assembling a blade retention disk in conformance with the invention, the assembly method comprising:
- a first step of positioning the crown around the peripheral annular groove;
- a second step of positioning a first radial opening of said crown opposite from the loading orifice;
- a third step of inserting, via said first radial opening, a blade root into said loading orifice;
- a fourth step of sliding in said annular groove said blade root such that a second radial opening of said crown is positioned opposite from said loading orifice;
- the second, third and fourth steps being repeated a number of times equal to the number of blade roots positioned in said peripheral annular groove.

BRIEF DESCRIPTION OF THE DRAWINGS

Other characteristics and benefits of the blade retention disk according to various embodiments of the invention will clearly emerge from the description given below, for indicative and in no way limiting purposes, with reference to the attached figures among which.

DETAILED DESCRIPTION

Figure 1:
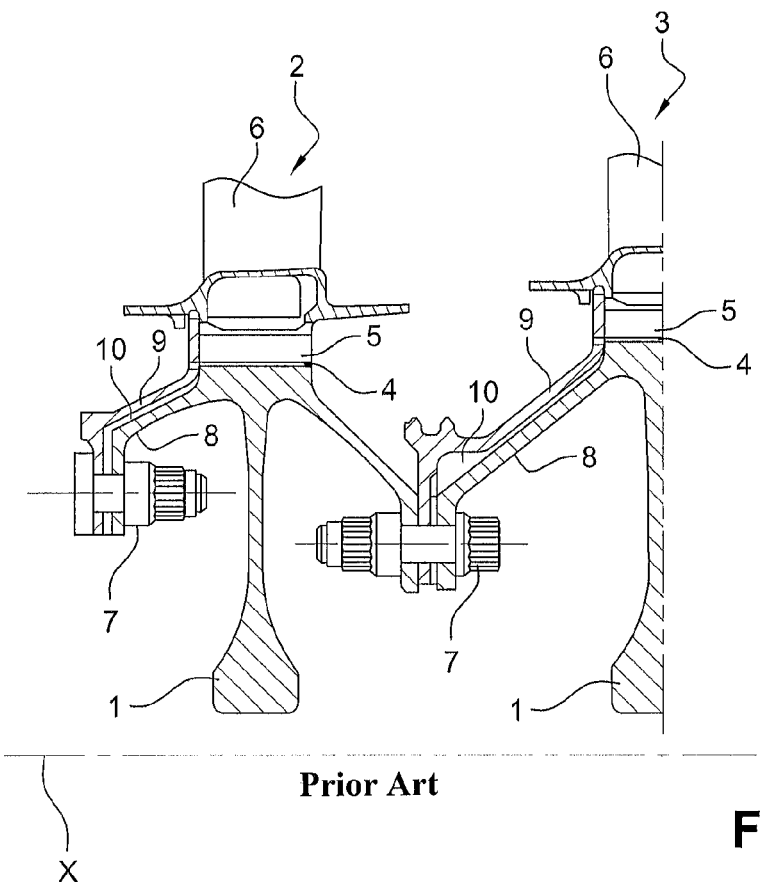
FIG. 1 represents two stages of a low pressure turbine in conformance with those from the prior art.

FIG. 1 was utilized to illustrate the prior art.

For reasons of clarity, only the elements essential for understanding the invention have been represented, without respecting the scale and schematic manner.

Figure 2:
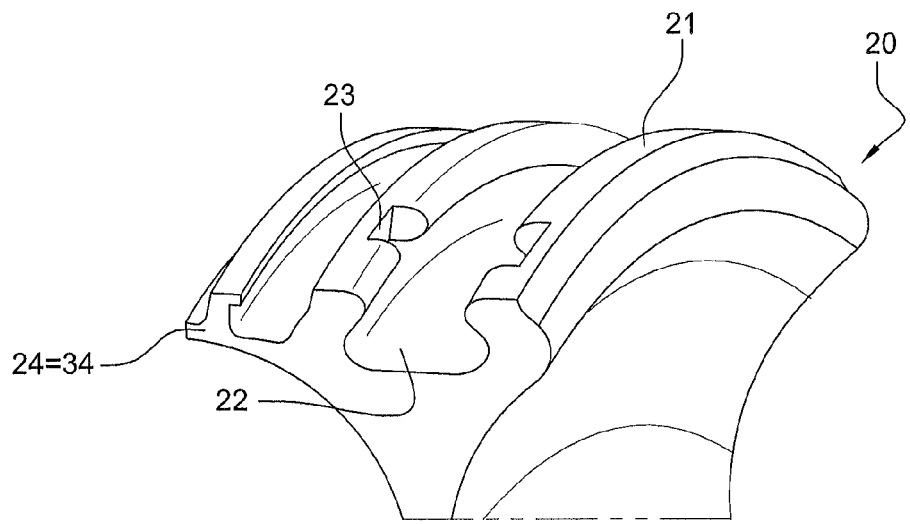
FIG. 2 represents a three-dimensional view of part of a blade retention disk in conformance with that of an embodiment of the invention.

FIG. 2 represents a three-dimensional view of part of a blade retention disk 20 in conformance with that of an embodiment of the invention.

Disk 20 comprises, on its external surface 21, a peripheral annular groove 22. This annular groove 22 is able to receive a plurality of blade roots (not represented) of the hammer attachment type.

In a non-limiting embodiment, the annular groove 22 is produced using a lathe type machine tool.

In addition, the annular groove 22 comprises a loading orifice 23 intended for the introduction of blade roots in the annular groove 22. In fact, each blade root is introduced in the loading orifice 23 and then is slid into the annular groove 22 to be maintained therein. For this purpose, the annular groove 22 presents a shape complementary to that of the blade roots such that each blade root is maintained in the annular groove 22 by simple collaboration of shape with the lateral walls of the latter. This special feature thus enables the blades to be maintained in the radial direction with relation to the retention disk 20 in which their root is housed.

In addition, the disk 20 comprises a crown centering device or system 24 configured to center a crown 25 (represented in FIG. 3 and in FIG. 4) surrounding the annular groove 22. The crown 25 comprises an annular hook 26 adapted to cooperate with the crown centering device 24. It will be appreciated that the crown centering device may be broadly referred to as a crown positioner as it is configured to center and/or position the crown 25 with respect to the disk 20.

This crown 25 also comprises a plurality of radial openings 27, each radial opening 27 being able to receive a blade root.

In a non-limiting embodiment, the crown 25 is produced with a metal band (or sheet) that is wound to form the crown 25, this metal band (or sheet) may be produced with a nickel- or cobalt-based type alloy.

Figure 3:
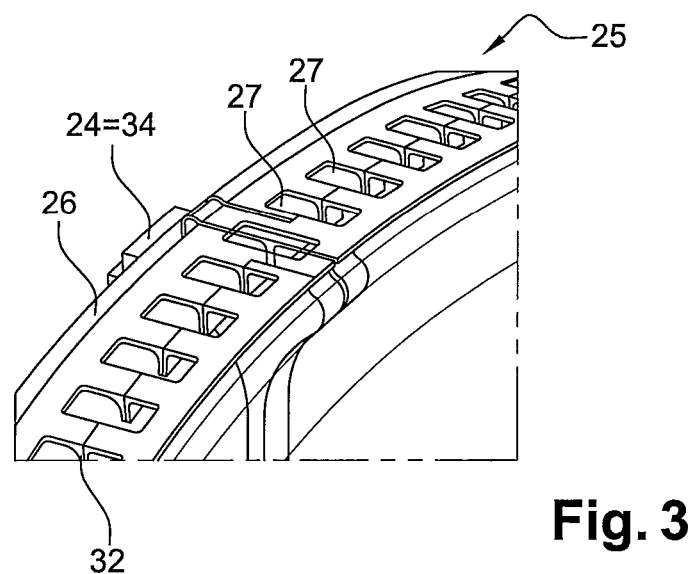
FIG. 3 illustrates a three-dimensional view of part of a blade retention disk identical to that represented in FIG. 2, also comprising a crown.
Figure 4:
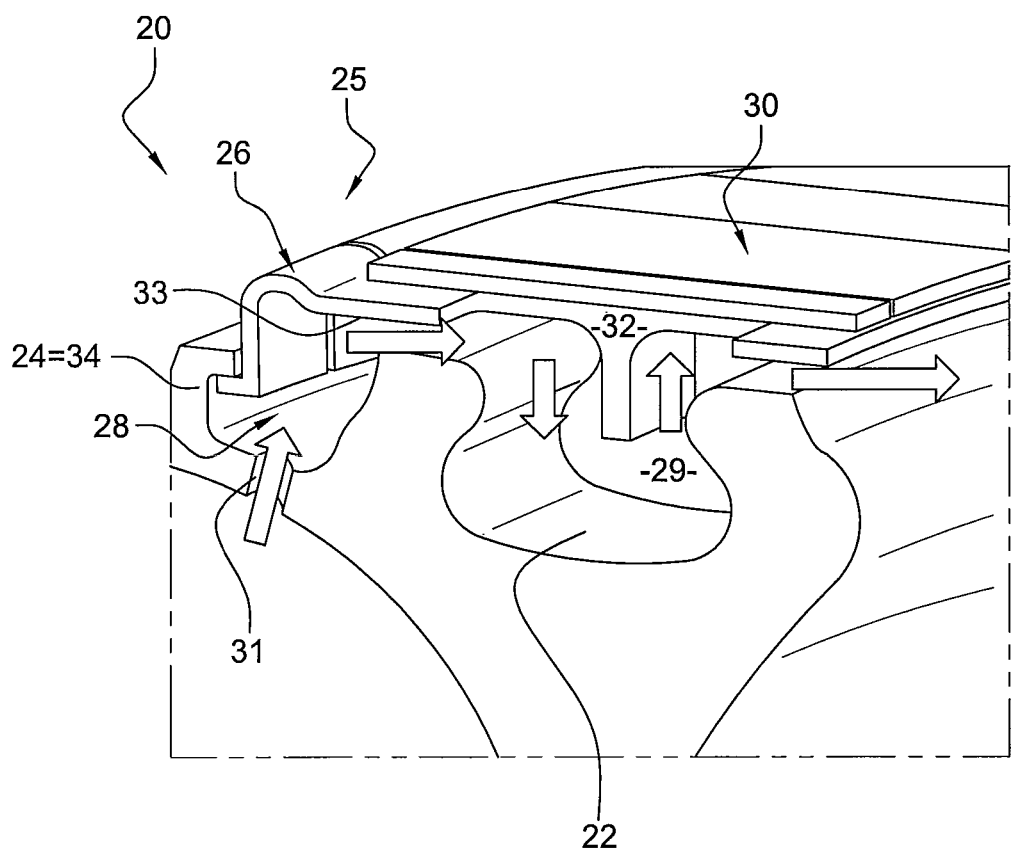
FIG. 4 represents an enlargement of part of a blade retention disk similar to that represented in FIG. 3.

In a non-limiting embodiment represented in FIGS. 2, 3 and 4, the crown centering device 24 is arranged from the upstream side of the retention disk 20 and is formed by or includes an annular spoiler (or hook) 34 axially extending the retention disk 20 at the level of its periphery. It is understood that the crown centering device 24 may be arranged differently or may present a different form in other embodiments.

As illustrated in FIG. 4, the combination of the crown centering device 24 and the crown 25 enables a cooling air supply annular enclosure 28 to be formed. This enclosure 28 is leakproof on the upstream side of the retention disk 20 thanks to the cooperation of the annular hook 26 of the crown 25 with the crown centering device 24. In addition, the enclosure 28 is open at its downstream end.

As represented in FIG. 4, each blade root 29 comprises a platform 30, each platform 30 being positioned in contact and above the crown 25 so as to maintain this crown 25. In other words, the crown 25 is clasped between the external surface 21 of the retention disk 20 and the platforms 30 of the blade roots 29.

The crown centering device 24 also comprises an air supply orifice 31 of the enclosure 28. Thus, when the turbine engine is operating, a part of the air circulating in the compression chamber (not represented) penetrates into the enclosure 28 via the orifice 31 to then be diffused into the annular groove 22. This air enables the bottom of the annular groove 22 to be cooled. The air then escapes from the annular groove 22 via the downstream end of the enclosure 28.

It is understood that the crown centering device 24 may comprise a plurality of air supply orifices 31.

In addition, as illustrated in FIGS. 3 and 4, the crown comprises a plurality of reflectors 32. Each reflector 32 is arranged radially between two adjacent radial openings 27 and extends from the inner surface 33 of the crown 25 to its center. All the reflectors 32 are arranged in the annular groove 22 so as to force the air from the orifice 31 to come into contact with the bottom of annular groove 22.

Thus, part of the air from the compression chamber penetrates into the enclosure 28 via the orifice 31 and then bypasses the reflectors 32 to pass to the bottom of the annular groove 22 and exit again from the downstream side of the retention disk 20. In addition, as the retention disk 20 is in rotation, the air that penetrates to the bottom of the annular groove 22 cools the entire bottom of the groove.

In other words, the crown centering device 24 and crown 25 enable the environment situated around the hammer attachments (or blade roots 29) to be partitioned so as to be able to supply them with air.

Figure 5:
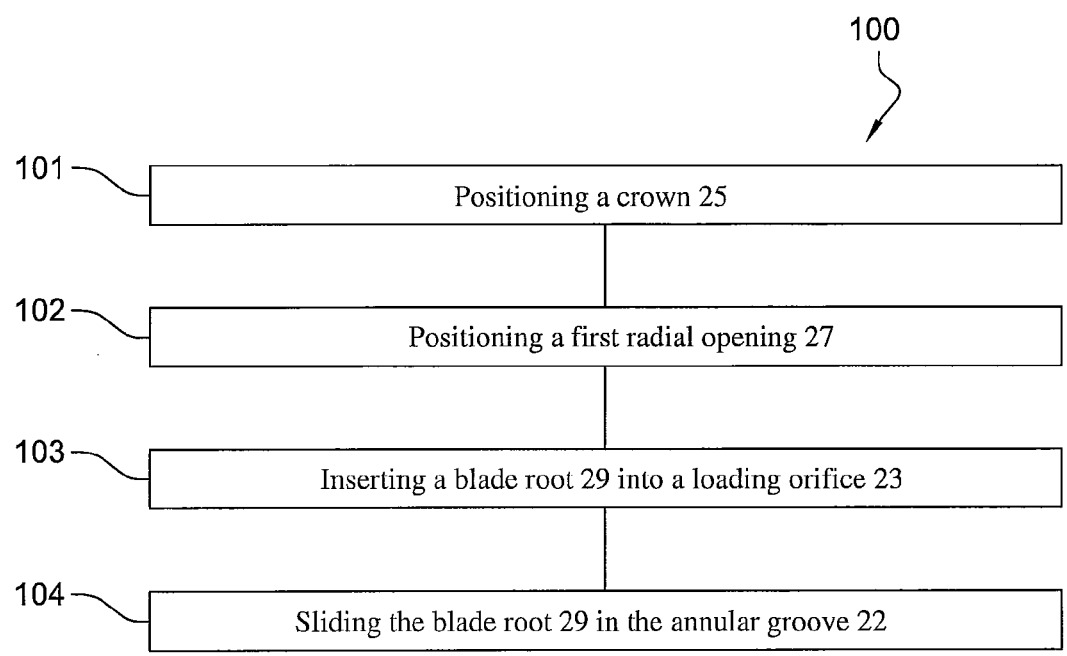
FIG. 5 illustrates a block diagram of the steps of a method for assembling a blade retention disk in conformance with an embodiment of the invention.

In addition, as represented in FIG. 5, the blade retention disk assembly 20 according to an embodiment of the invention is produced according to a specific method 100 comprising, in particular:

- a first operation 101 of positioning the crown 25 around the annular groove 22; when the crown 25 is formed by a metal band, the metal band is wound around disk 20;
- a second operation 102 of positioning a first radial opening 27 of crown 25 opposite from the loading orifice 23;
- a third operation 103 of inserting, via the first radial opening 27, a blade root 29 into loading orifice 23;
- a fourth operation 104 of sliding in the annular groove 22 of blade root 29 such that a second radial opening 27 of crown 25 is positioned opposite from the loading orifice 23;
- the second, third and fourth operations 102, 103 and 104 being repeated a number of times equal to the number of blade roots 29 positioned in the annular groove 22.

In addition, the blade retention disk was more particularly described for a low pressure turbine of an aircraft turbine engine application. However, it may also be desirable to utilize the same blade retention disk in the case of a high-pressure aircraft compressor without departing from the scope of the invention.

The blade retention disk is described in the foregoing by way of example, it is understood that the person skilled in the art is capable of producing different variations of the blade retention disk, in particular relating to the form and/or arrangement of the centering device and/or the crown hook, without necessarily departing from the scope of the invention.

What is claimed is:

1. A blade retention disk comprising, on its external surface, a peripheral annular groove configured to receive a plurality of blade roots of the hammer attachment type, said peripheral annular groove comprising a loading orifice configured for the introduction of blade roots inside said peripheral annular groove, said retention disk comprising:
    a crown covering said peripheral annular groove;
    a crown centering device configured to center said crown, said crown centering device and said crown forming an air supply enclosure from the bottom of said peripheral annular groove;
    at least one orifice opening in said air supply enclosure, said orifice being configured to introduce cooling air into said air supply enclosure.

2. The blade retention disk according to claim 1, wherein the crown centering device is formed by an annular spoiler axially prolonging the retention disk at a level of the upstream periphery of said retention disk.

3. The blade retention disk according to claim 1, wherein the crown comprises a hook configured to cooperate with the crown centering device.

4. The blade retention disk according to claim 1, wherein the crown is formed by a metal band wound on itself.

5. The blade retention disk according to claim 1, wherein the crown is equipped with a plurality of radial openings, each radial opening being positioned opposite from the peripheral annular groove.

6. The blade retention disk according to claim 1, wherein the orifice crosses the crown centering device.

7. A blade retention drum comprising at least two blade retention disks according to claim 1, said two blade retention disks being coaxial and forming an integral part with each other.

8. A turbine engine comprising at least one blade retention disk according to claim 1.

9. The blade retention disk according to claim 1, wherein the at least one orifice is provided in the blade retention disk.

10. The blade retention disk according to claim 1, wherein the crown is adapted to cooperate with the crown centering device so that a lower surface of the crown is spaced apart from an upper surface of the blade retention disk, when said crown covers said peripheral annular groove, to permit the cooling air to flow from said air supply enclosure of the crown centering device to the annular groove via a space formed between the lower surface of the crown and the upper surface of the blade retention disk.

11. A blade retention disk comprising, on its external surface, a peripheral annular groove configured to receive a plurality of blade roots of the hammer attachment type, said peripheral annular groove comprising a loading orifice configured for the introduction of blade roots inside said peripheral annular groove, said retention disk comprising:
    a crown covering said peripheral annular groove;
    a crown centering device configured to center said crown, said crown centering device and said crown forming an air supply enclosure from the bottom of said peripheral annular groove;
    at least one orifice opening in said air supply enclosure, said orifice being configured to introduce cooling air into said air supply enclosure, wherein the crown comprises a plurality of reflectors configured to be arranged in the peripheral annular groove, each reflector being positioned between two radial openings and radially extending from the inner surface of said crown to its center.

12. A method for assembling a blade retention disk, said method comprising:
    positioning a crown around a peripheral annular groove of a blade root;
    after positioning said crown, positioning a first radial opening of said crown opposite from a loading orifice;
    after positioning said first radial opening, inserting, via the first radial opening, a blade root into said loading orifice;
    after said inserting, sliding said blade root in said peripheral annular groove such that a second radial opening of said crown is positioned opposite from said loading orifice;
    said positioning a first radial opening, said inserting and said sliding being repeated a number of times equal to the number of blade roots positioned in said annular groove.

* * * * *